United States Patent
Geller

(10) Patent No.: US 9,809,158 B2
(45) Date of Patent: Nov. 7, 2017

(54) EXTERNAL INDICATORS AND NOTIFICATIONS FOR VEHICLES WITH AUTONOMOUS CAPABILITIES

(71) Applicant: Toyota Motor Engineering & Manufacturing North America, Inc., Erlanger, KY (US)

(72) Inventor: Benjamin M. Geller, Hermosa Beach, CA (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 4 days.

(21) Appl. No.: 14/869,716

(22) Filed: Sep. 29, 2015

(65) Prior Publication Data

US 2017/0088038 A1    Mar. 30, 2017

(51) Int. Cl.
| | | |
|---|---|---|
| B60Q 1/50 | (2006.01) | |
| G08G 1/0962 | (2006.01) | |
| G08G 1/0967 | (2006.01) | |

(52) U.S. Cl.
CPC ............ *B60Q 1/50* (2013.01); *G08G 1/0962* (2013.01); *G08G 1/096716* (2013.01); *G08G 1/096791* (2013.01)

(58) Field of Classification Search
CPC ...... B60Q 1/50; B60Q 1/2696; G05D 1/0088; G08G 1/22; G08G 1/096791; G08G 1/0962; G08G 1/096716
USPC .................................. 340/438, 457, 463, 468
See application file for complete search history.

(56) References Cited

U.S. PATENT DOCUMENTS

| | | | |
|---|---|---|---|
| 7,133,767 B2 | 11/2006 | Ogino et al. | |
| 7,889,065 B2 | 2/2011 | Smith | |
| 7,979,173 B2 | 7/2011 | Breed | |
| 8,791,835 B2 | 7/2014 | Zhang | |
| 8,816,878 B2* | 8/2014 | Kadowaki | B62D 15/0285 340/438 |
| 8,825,264 B2 | 9/2014 | Montemerlo et al. | |
| 8,924,150 B2 | 12/2014 | Tsimhoni et al. | |

(Continued)

FOREIGN PATENT DOCUMENTS

| | | | |
|---|---|---|---|
| DE | 102009052590 | 5/2011 | |
| DE | 102009052590 A1 * | 5/2011 | ............. B60Q 1/488 |

OTHER PUBLICATIONS

Robocars: Roadblocks on the way; 5 pages; dated May 1, 2015.
Mercedes-Benz Unveils a Sleek and Shiny Self-Driving Car; 4 pages; dated May 6, 2015.

*Primary Examiner* — Brian Wilson
(74) *Attorney, Agent, or Firm* — Snell & Wilmer L.L.P.

(57) ABSTRACT

A method for notifying a third party or a third party device (e.g., a mobile phone or a second vehicle) as to whether a first vehicle is operating in an autonomous mode or a semi-autonomous mode. The method includes receiving, at a first electronic control unit, notification information including whether the first vehicle is operating in the autonomous mode or the semi-autonomous mode and a description of or details about the first vehicle and transmitting from a transmitter of the first vehicle to a receiver of the third party device, the notification information. The method also includes displaying, using a display screen of the third party device, the notification information including whether the first vehicle is operating in the autonomous mode or the semi-autonomous mode and the description of or the details about the first vehicle.

17 Claims, 6 Drawing Sheets

(56) References Cited

U.S. PATENT DOCUMENTS

| | | | |
|---|---|---|---|
| 8,948,955 B2 | 2/2015 | Zhu et al. | |
| 9,002,563 B2 | 4/2015 | Green et al. | |
| 9,513,632 B1* | 12/2016 | Gordon | G05D 1/0061 |
| 2010/0256836 A1* | 10/2010 | Mudalige | G08G 1/163 |
| | | | 701/2 |
| 2011/0080302 A1* | 4/2011 | Muthaiah | H04L 47/10 |
| | | | 340/903 |
| 2012/0310465 A1 | 12/2012 | Boatright et al. | |
| 2013/0325202 A1 | 12/2013 | Howard et al. | |
| 2014/0139341 A1* | 5/2014 | Green | B60K 28/06 |
| | | | 340/576 |
| 2014/0375810 A1* | 12/2014 | Rodriguez | B60Q 1/50 |
| | | | 348/148 |
| 2015/0006005 A1 | 1/2015 | Yu et al. | |
| 2015/0149019 A1* | 5/2015 | Pilutti | G08G 1/22 |
| | | | 701/23 |

* cited by examiner

EXTERNAL INDICATORS AND NOTIFICATIONS FOR VEHICLES WITH AUTONOMOUS CAPABILITIES

BACKGROUND

1. Field

The present invention relates to systems and methods that provide an external indicator on a vehicle and/or transmits notification information from the vehicle to one or more other vehicles or to one or more devices indicating that the vehicle is operating with semi-autonomous or autonomous features. The external indicator is visible from outside the vehicle to notify or show others that the vehicle is currently operating with semi-autonomous or autonomous features.

2. Description of the Related Art

Many automotive companies are currently developing semi-autonomous and autonomous vehicles. A semi-autonomous vehicle is a vehicle that has a driver but provides driver assistance such as automatic braking in the event of a potential accident. Semi-autonomous vehicles provide the driver with many advanced active driving and safety features. A semi-autonomous vehicle utilizes sensors and intelligent systems to augment what the driver is doing by enhancing the driver's ability to safely operate and control the vehicle. This is often thought of as a co-pilot where the sensors and intelligent systems are used to give the driver assistance when needed.

An autonomous vehicle, also known as a self-driving vehicle, is a vehicle that does not have a driver. Autonomous vehicles sense their surroundings and navigate without a driver or driver input. Advanced control systems and techniques such as radars, sensors, GPS and computer vision are implemented in autonomous vehicles to assist with self-driving maneuvers. These advanced control systems and techniques interpret sensory information to identify appropriate navigation paths and relevant signage as well as provide obstacle avoidance. Autonomous vehicles are capable of updating their maps in real-time allowing the vehicles to keep track of their position even when conditions change or when they approach or enter new environments. Semi-autonomous and autonomous vehicles are thought of as providing a safe, effective and efficient means of transportation.

Drivers of non-autonomous vehicles and third parties, however, might find it difficult to identify or determine which vehicles on the road are semi-autonomous or autonomous. For example, some autonomous vehicles have large cameras and equipment on top of their hoods, roofs and trunks. This equipment can be seen when close up but is difficult to see when far away. Also, semi-autonomous vehicles generally don't have cameras and equipment that are visible by other drivers or third parties.

Thus, there is a need for systems and methods that help drivers and third parties identify semi-autonomous and autonomous vehicles.

SUMMARY

A method for notifying a third party or a third party device (e.g., a mobile phone or a second vehicle) as to whether a first vehicle is operating in an autonomous mode or a semi-autonomous mode. The method includes receiving, at a first electronic control unit, notification information including whether the first vehicle is operating in the autonomous mode or the semi-autonomous mode and a description of or details about the first vehicle and transmitting from a transmitter of the first vehicle to a receiver of the third party device, the notification information. The method also includes displaying, using a display screen of the third party device, the notification information including whether the first vehicle is operating in the autonomous mode or the semi-autonomous mode and the description of or the details about the first vehicle.

A method for notifying a user as to whether a vehicle is operating in an autonomous mode or a semi-autonomous mode. The method includes receiving, at a processor, notification information including whether the vehicle is operating in the autonomous mode or the semi-autonomous mode and a description of the vehicle. The method also includes activating, using the processor, an external indicator of the vehicle when the vehicle is operating in the autonomous mode or the semi-autonomous mode. The method also includes transmitting the notification information from a transmitter coupled to the processor to a receiver of a remote device and displaying, using a display screen of the remote device, the notification information including whether the first vehicle is operating in the autonomous mode or the semi-autonomous mode and the description of the first vehicle.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
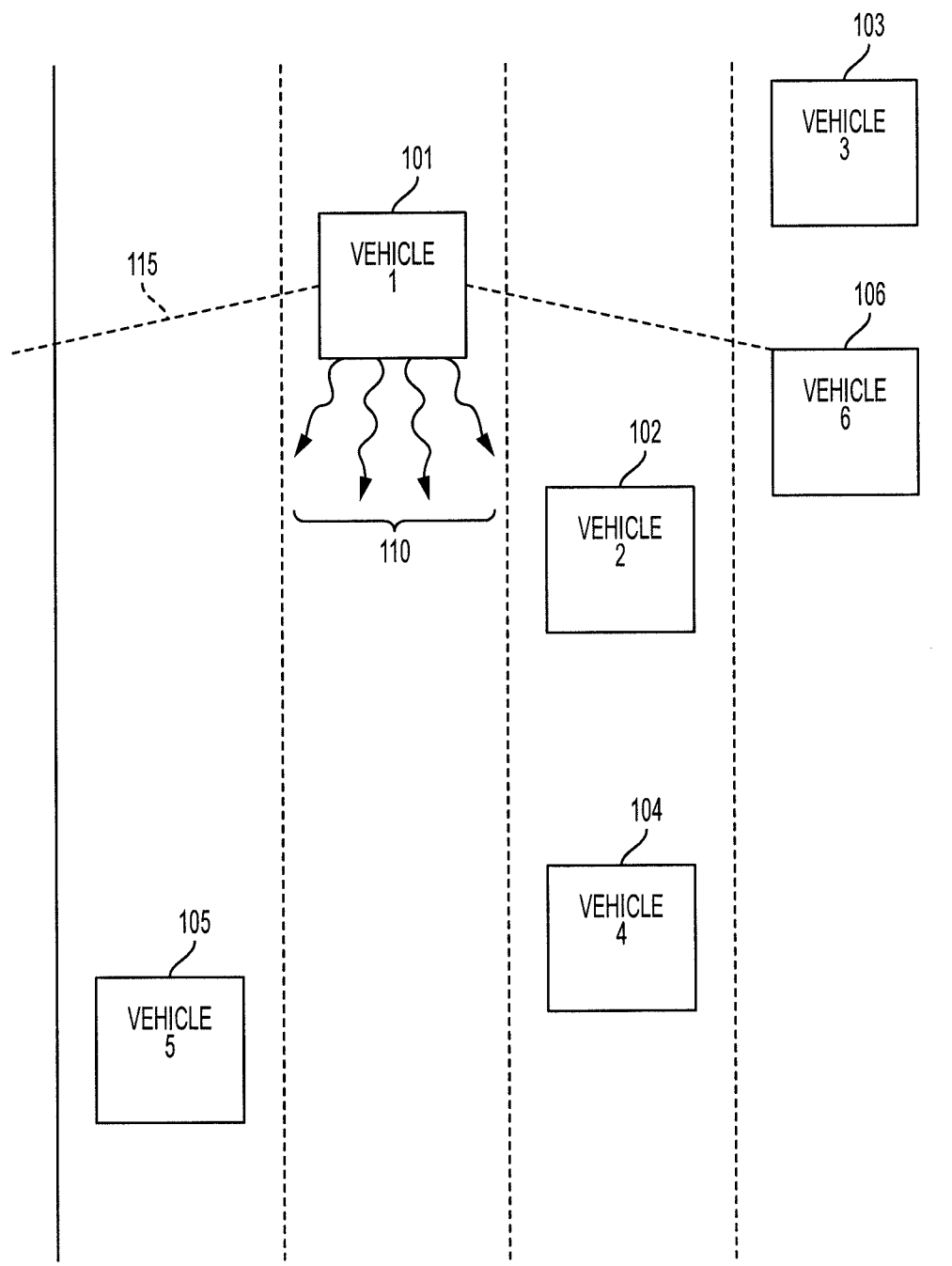
FIG. 1 illustrates a simplified map showing a number of vehicles travelling on a freeway and notification information being sent from one vehicle to one or more other vehicles or devices indicating that the vehicle is operating with semi-autonomous or autonomous features according to an embodiment of the present invention.

The systems, ECUs and methods described herein provide third party devices or third parties (e.g., police officers, administrators, government officials, traffic enforcers, other drivers, pedestrians, etc.) with a dynamic, real-time determination and notification as to whether a vehicle is currently operating with autonomous or semi-autonomous capabilities. That is, the system 200 or the vehicle 101 with autonomous or semi-autonomous capabilities is able to notify other vehicles, devices and individuals that it has these capabilities and is currently operating with these capabilities.

The vehicle 101 (or system 200) provides this notification using the external indicator 230 and/or by transmitting the notification information 110 to other vehicles (e.g., vehicles 102 and 104) or devices 250. For example, if the vehicle 101 is driving through traffic using adaptive cruise control, the vehicle 101 may notify other drivers or third parties using the external indicator 230 and/or by transmitting the notification information 110 that it is using adaptive cruise control. The notification allows drivers (or third parties or devices) to easily and readily identify or determine which vehicles on the road are operating in a semi-autonomous or autonomous mode. The other drivers can then follow the vehicle 101 because the vehicle 101 may be a good vehicle to follow through traffic in order to advantageously provide a more predictable and smooth route through traffic, reduce commute or travel times, increase fuel economy and efficiency, reduce emissions and enhance safety. The vehicle 101, operating in an autonomous or semi-autonomous mode, does not produce as many emissions as other vehicles due to the lack of sudden speed changes and better intelligence and guidance through traffic. The external indicator 230 may also encourage other drivers to drive their vehicles in a manner similar to the autonomous or semi-autonomous vehicle 101, thereby reducing overall emissions.

The systems and methods transmit the notification information 110 from the first vehicle 101 to one or more devices or systems 250 (e.g., smart phones) and/or other vehicles (e.g., the second vehicle 102). The notification information 110 may include data such as whether the vehicle 101 is operating in an autonomous or semi-autonomous mode, which features (e.g., adaptive cruise control) of the autonomous or semi-autonomous mode are active and/or inactive, whether the external indicator 230 of the vehicle 101 is on or off, a make, a model, a year, a color, a type of vehicle (e.g., number of doors, hatchback, SUV, sedan, coupe, truck, etc.), a license plate number and a photo of the vehicle 101. By reviewing the notification information 110 and/or by observing the external indicator(s) 230, the drivers of the other vehicles (or third party using a device) are able to quickly and easily determine whether the vehicle 101 is operating with autonomous or semi-autonomous capabilities.

An exemplary method is disclosed for notifying a third party or a third party device (e.g., a mobile phone or a second vehicle) as to whether a first vehicle is operating in an autonomous mode or a semi-autonomous mode. The method includes receiving, at a first electronic control unit, notification information including whether the first vehicle is operating in the autonomous mode or the semi-autonomous mode and a description of or details about the first vehicle and transmitting from a transmitter of the first vehicle to a receiver of the third party device, the notification information. The method also includes displaying, using a display screen of the third party device, the notification information including whether the first vehicle is operating in the autonomous mode or the semi-autonomous mode and the description of or the details about the first vehicle.

FIG. 1 illustrates a simplified map showing a number of vehicles (101-106) travelling on a freeway and notification information 110 being sent or transmitted from one vehicle (e.g., vehicle 1) to one or more other vehicles (e.g., vehicles 2 and 4) and/or one or more other devices. The notification information 110 can be sent or transmitted using radio frequency (RF), short wave communications, wireless fidelity (Wi-Fi), Bluetooth® or cellular communications, signals or waves. The notification information 110 indicates to the other vehicles (or devices) that the vehicle 101 is currently operating with semi-autonomous or autonomous features. Generally, the notification information 110 is sent or transmitted to vehicles that are behind, to the sides and/or within a predefined range (preferably 25-100 meter range) of the vehicle 101. The notification information 110 can also be sent or transmitted to vehicles and/or devices that are travelling or moving the same or similar direction. In one embodiment, the vehicle 101 may transmit the notification information 110 in rear and side directions 115 and only towards vehicles in these directions 115 and up to a 100 meter range (e.g., vehicles 102, 104 and 106) will receive the notification information 110. The vehicles to the front (e.g., vehicle 103) and the vehicles further away (e.g., vehicle 105, which is greater than 100 meters away) will not receive the notification information 110.

The notification information 110 is useful in communicating to other drivers that the vehicle 101 is currently operating in an autonomous or semi-autonomous mode and that the vehicle 101 may be a good vehicle to follow through traffic in order to provide a more predictable and smooth route through traffic, reduce commute or travel times, reduce emissions and/or enhance safety. The vehicles 101-106 can be conventional internal combustion engine vehicles, electric vehicles (EVs), hybrid vehicles (HVs), plug-in hybrid vehicles (PHVs), fuel cell vehicles (FCVs), fuel cell electric vehicles (FCEVs) and other similar vehicles.

Figure 2:
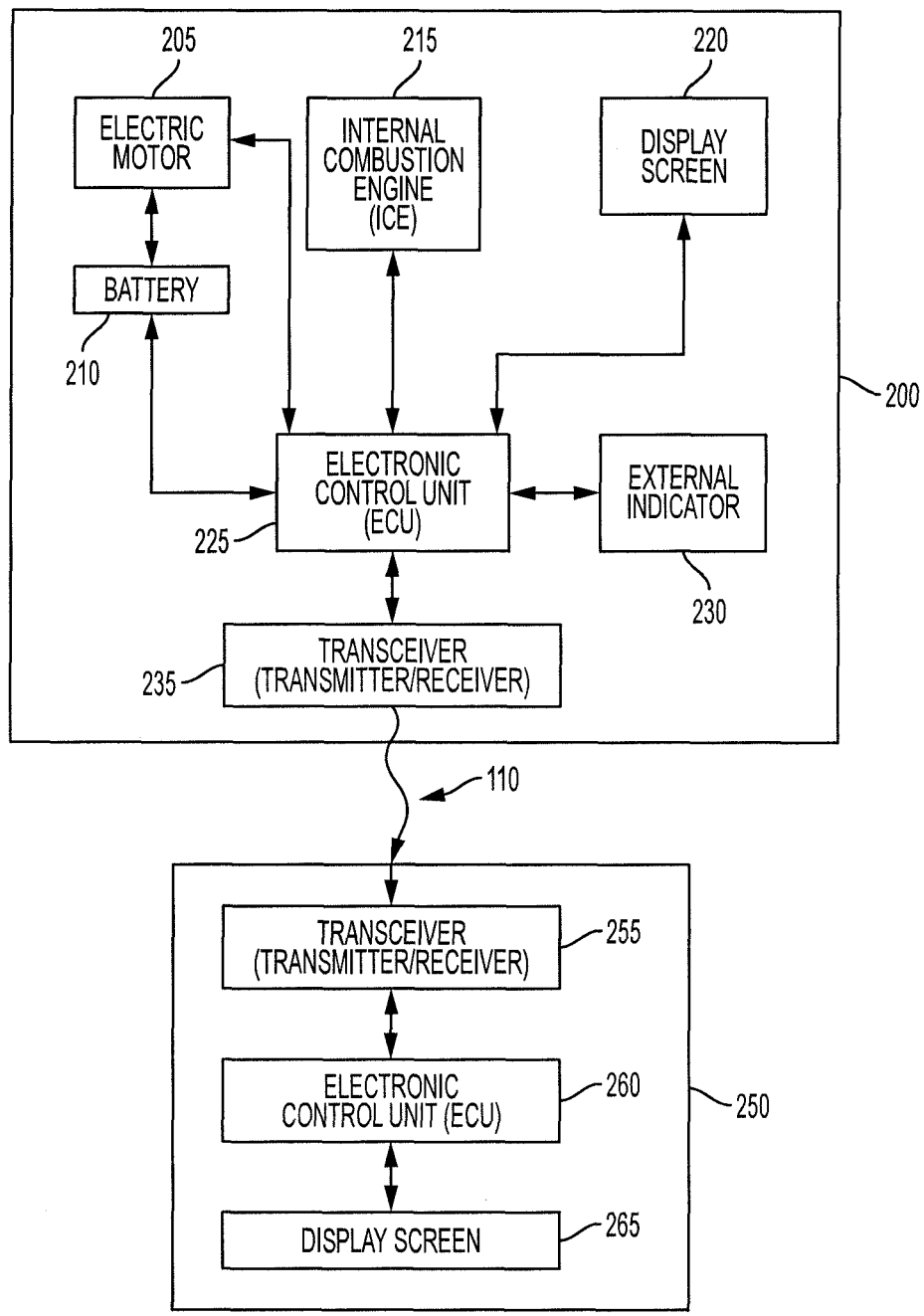
FIG. 2 illustrates a simplified block diagram of a system for transmitting the notification information of FIG. 1 and a system for receiving the notification information according to an embodiment of the present invention.

FIG. 2 illustrates a simplified block diagram of a system 200 for transmitting the notification information 110 of FIG. 1 and a system 250 for receiving the notification information 110. As an example, the system 200 is generally on the autonomous or semi-autonomous vehicles (e.g., vehicle 101) and the system 250 is generally on the non-autonomous vehicles (e.g., vehicles 102-106).

The system 200 may include an electric motor 205, a battery 210 (or batteries), an internal combustion engine (ICE) 215, a display screen 220, an electronic control unit (ECU) 225, an external indicator 230 and a transceiver 235 (transmitter and/or receiver). A fuel cell can be used in place of the internal combustion engine 215. The term "engine" will be used in this disclosure but one skilled in the art will know how to utilize a fuel cell in place of the engine 215. The ECU 225 can be a processor with a memory. The display screen 220 can be a touch screen or allow for input using an input device.

The external indicator 230 may be a light or an indication that is external (e.g., on an external portion or surface) to the vehicle 101 indicating that the vehicle 101 is currently operating in an autonomous or semi-autonomous mode. The external indicator 230 allows third parties (e.g., people, police officers, administrators, government officials, traffic enforcers, other drivers, pedestrians, etc.) or third party devices (e.g., mobile phones or devices) to be notified as to whether the vehicle 101 is currently operating in an autonomous or semi-autonomous mode. The external indicator 230 can be LED lights that when illuminated indicate an autonomous or semi-autonomous operation of the vehicle 101. The external indicator 230 can also take the form of external badges, emblems, charge doors, etc. Based on whether the vehicle 101 is operating in the autonomous or semi-autonomous mode, the ECU 225 can send a signal to turn on and turn off the external indicator(s) 230. In one embodiment, the user cannot override the ECU 225 in order to turn on the external indicator 230 when the vehicle 101 is not operating in the autonomous or semi-autonomous mode. This prevents the driver or user from being able to indicate the autonomous or semi-autonomous mode without actually being in one of these modes.

The system 250 may include a transceiver 255 (transmitter and/or receiver), an electronic control unit (ECU) 260 and a display screen 265. The ECU 260 can be a processor with a memory. The display screen 265 can be a touch screen or allow for input using an input device. The system 250 can be a remote or portable device such as a cell phone, smart phone or tablet device having an antenna for receiving and transmitting signals, a transceiver, a processor and/or a display screen. This will allow individuals and other users the ability to receive the notifications on their smart phones or other devices without being tied to a particular vehicle. The system 250 is generally remote from the vehicle 101. The system 250 can also be integrated into another vehicle (e.g., a second vehicle 102) or part of a remote or portable device. The systems 200 and 250 can also be configured to allow two way voice and data communications, chat sessions, phone calls, text messaging and other interaction and support. For example, the driver of vehicle 102 can use system 250 to communicate with and contact the driver of vehicle 101 using system 200.

The ECUs 225 and 260 may each include a processor and a memory that stores the notification information 110. For example, the notification information 110 may include data such as whether the vehicle 101 is operating in an autonomous or semi-autonomous mode, which features (e.g., adaptive cruise control) of the autonomous or semi-autonomous mode are active and/or inactive, whether the external indicator 230 of the vehicle 101 is on or off, a make, a model, a year, a color, a type of vehicle (e.g., number of doors, hatchback, SUV, sedan, coupe, truck, etc.), a license plate number and a photo of the vehicle 101. This data or information can be input by the driver or a passenger using the display screen 220, can be pre-stored in the memory of the ECU 225 and/or can be determined by the ECU 225. For example, the driver can load or store a recent photo and the license plate number of the vehicle 101 in the memory of the ECU 225. The make, model, year, color and type of vehicle can be pre-stored in the memory of the ECU 225. Also, the ECU 225 can determine whether the vehicle 101 is operating in an autonomous or semi-autonomous mode, which features (e.g., adaptive cruise control) of the autonomous or semi-autonomous mode are active and/or inactive and whether the external indicator 230 of the vehicle 101 is on or off.

The ECU 225 may determine or obtain the notification information 110 or retrieve the notification information 110 from its memory and transmit it via the transceiver 235 to the other vehicles (e.g., vehicles 102 and 104) or devices 250 in the vicinity.

Figure 3:
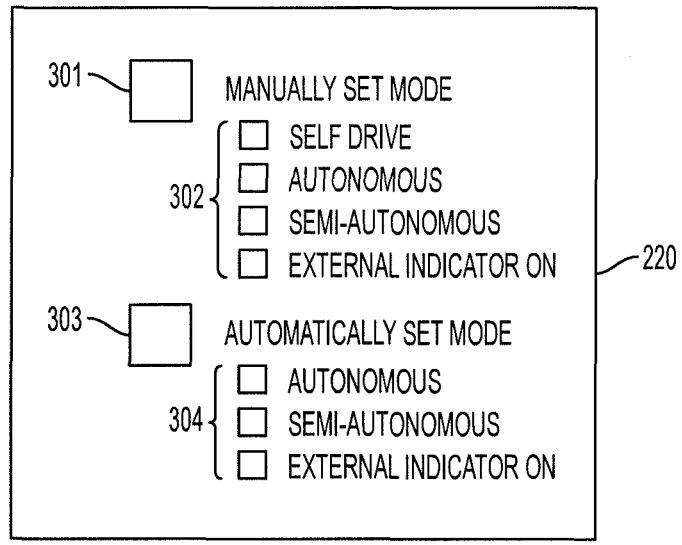
FIG. 3 illustrates an exemplary view of the display screen for allowing the driver to manually set the mode of the vehicle or automatically set the mode of the vehicle according to an embodiment of the present invention.

FIG. 3 illustrates an exemplary view of the display screen 220 for allowing the driver to manually set the mode of the vehicle 101 or automatically set the mode of the vehicle 101. Using the touch display screen 220, the driver can select whether the mode of the vehicle 101 should be set manually or automatically. The driver can touch one of the large squares 301 or 303 to make the selection. If the manually set mode 301 is selected, the driver will also need to select one or more of the small squares 302 to complete the set up. If the automatically set mode 303 is selected, the ECU 225 may make a selection based on, for example, whether there is a driver in the driver seat. If no driver is in the driver seat, the ECU 225 will select the autonomous mode. If there is a driver in the driver seat, the ECU 225 will select the semi-autonomous mode. Also, the ECU 225 may automatically turn on the external indicator 230 if the vehicle 101 is in the autonomous or semi-autonomous mode or only when the vehicle 101 is in the autonomous mode.

Figure 4:
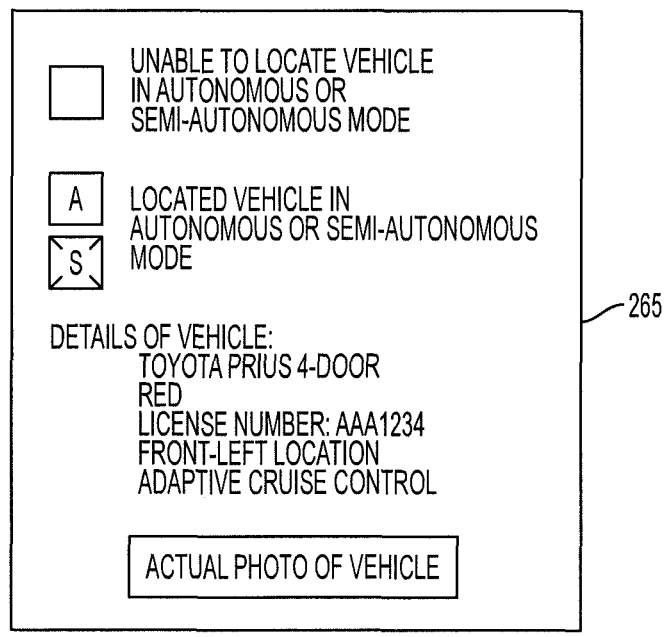
FIG. 4 illustrates an exemplary view of the display screen that displays the notification information providing the details of the autonomous or semi-autonomous vehicle to allow the driver of the other vehicle or a third party user of the device to locate the autonomous or semi-autonomous vehicle according to an embodiment of the present invention.

FIG. 4 illustrates an exemplary view of the display screen 265 that displays the notification information 110 providing the details of the autonomous or semi-autonomous vehicle 101 to allow the driver of the other vehicle 102 to locate the autonomous or semi-autonomous vehicle 101. The transceiver 255 receives the notification information 110 from the transceiver 235. The ECU 260 provides the notification information 110 to the display screen 265 for display. The display screen 265 allows the driver of the other vehicle 102 to view the notification information 110 and determine the location of the autonomous or semi-autonomous vehicle 101. The transceiver 255 may also determine the direction of the notification information 110 (e.g., the signal) and provide this direction information (e.g., front-left location) to the ECU 260 for display on the display screen 265.

Figure 5A:
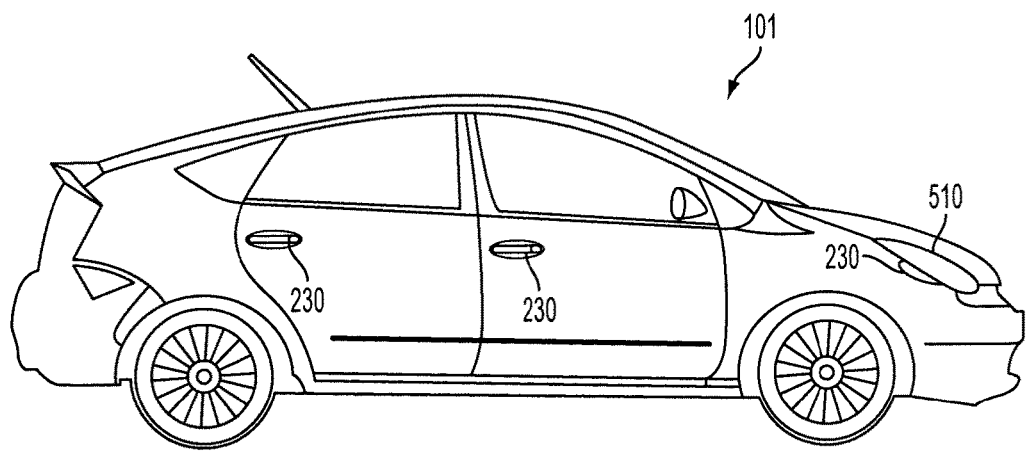
FIGS. 5A-5C illustrate side, rear and front views of the vehicle showing various exemplary locations for the external indicator according to various embodiments of the present invention.
Figure 5B:
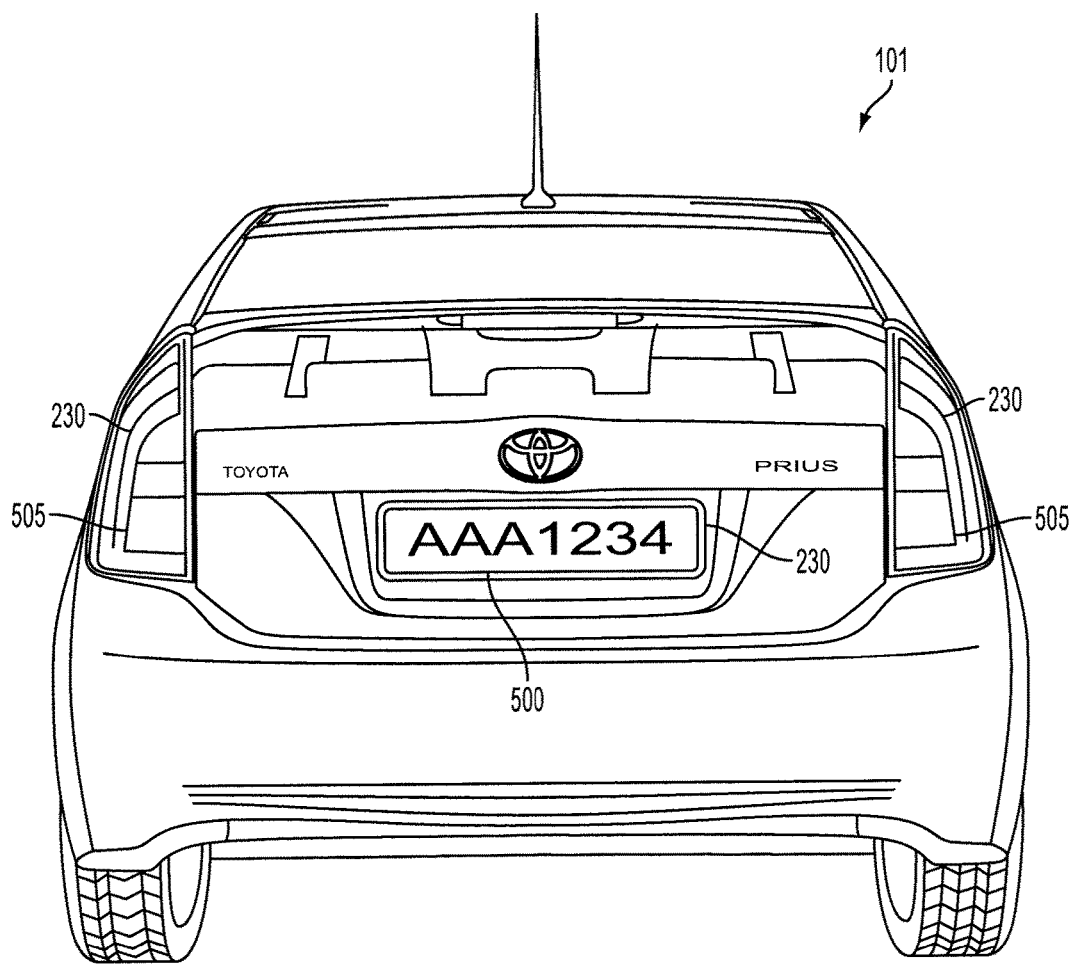
Figure 5C:
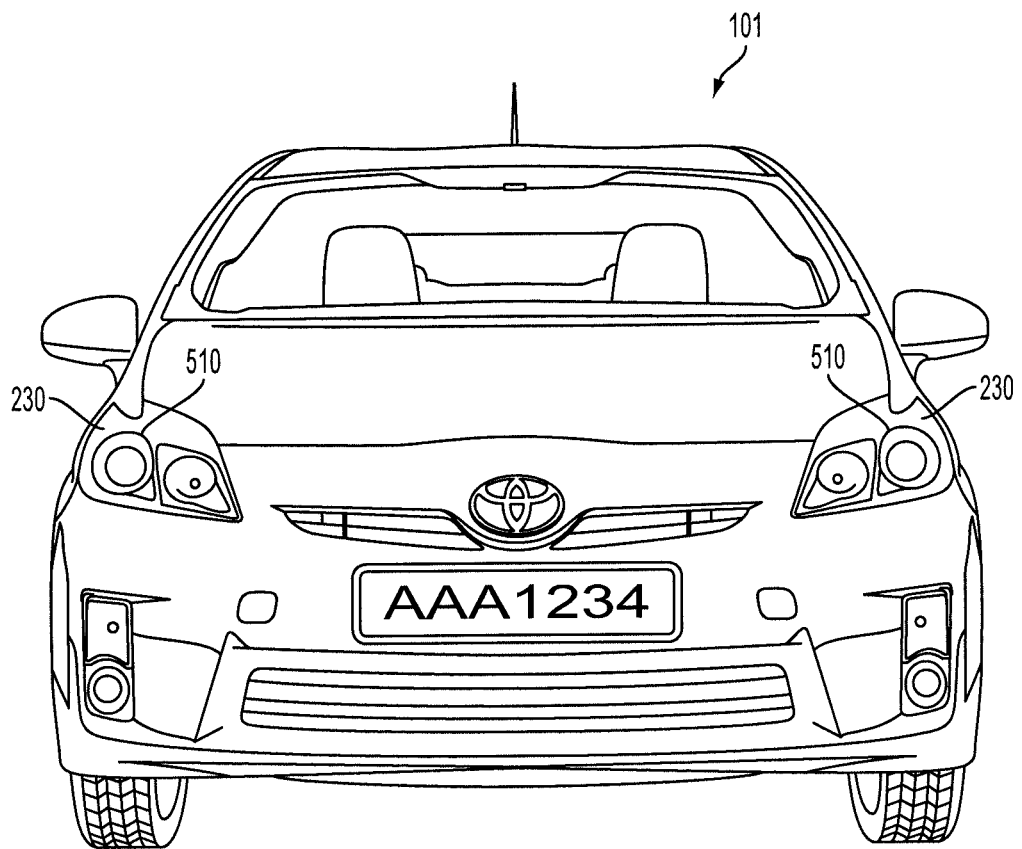

FIGS. 5A-5C illustrate side, rear and front views of the vehicle 101 showing various exemplary locations for the external indicator 230. FIG. 5A shows the external indicator 230 positioned on or adjacent to the door handles of the vehicle 101. FIG. 5B shows the external indicator 230 positioned around or adjacent to a license plate 500 and around or adjacent to the rear taillights 505. FIG. 5C shows the external indicator 230 positioned around or adjacent to the front headlights 510. The external indicator 230 can also be a green color or other color or shape designating an autonomous or semi-autonomous mode. This advantageously allows the external indicator 230 to be distinguishable from the white, red and yellow lights traditionally found on vehicles. The external indicator 230 is preferably around or adjacent to another light (e.g., the front headlights or the rear taillights) in order to minimize any distraction to other drivers. The external indicator 230 being around or adjacent to the license plate 500 provides a predictable and easy location for the third party to look in order to obtain this autonomous or semi-autonomous mode information.

One or more external indicators 230 (e.g., lights) can be located on the outside of the vehicle 101. The external indicator 230 is positioned to be easily viewed by other drivers. In some embodiments, the external indicator 230 is not viewable when the driver is sitting in the driver seat of the vehicle 101. When the ECU 225 determines that the vehicle 101 is operating with autonomous or semi-autonomous features, the ECU 225 automatically controls the illumination of the external indicator 230. In some embodiments, the driver of the vehicle 101 cannot control the illumination of the external indicator 230 but rather the illumination (i.e., turning on and off) of the external indicator 230 is controlled solely by the ECU 225. This prevents the driver from inadvertently switching on the external indicator 230 when the vehicle 101 is not operating with autonomous or semi-autonomous features.

Figure 6:
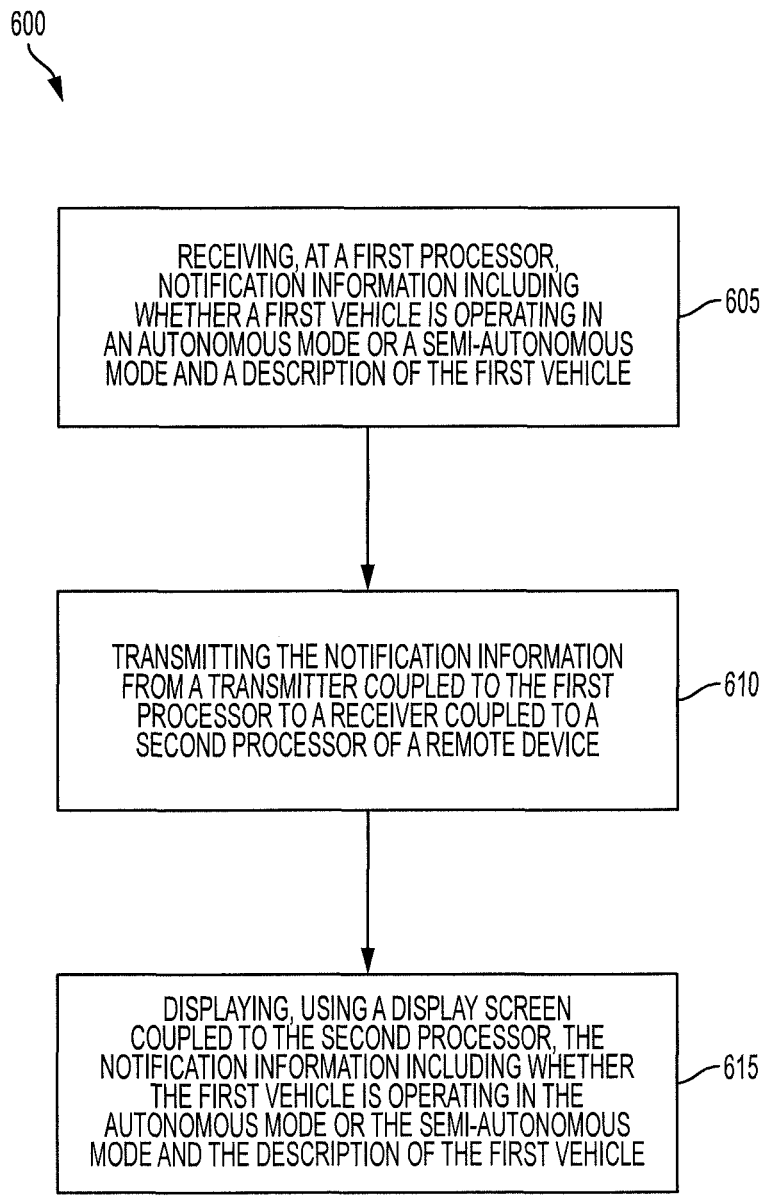
FIG. 6 is an exemplary method for notifying a third party or a third party device whether a first vehicle is operating in an autonomous mode or a semi-autonomous mode according to an embodiment of the present invention.

FIG. 6 is an exemplary method 600 for notifying a third party or a third party device whether a first vehicle is operating in an autonomous mode or a semi-autonomous mode according to an embodiment of the present invention. The method includes receiving, at a first processor, notification information including whether a first vehicle is operating in the autonomous mode or the semi-autonomous mode and a description of the first vehicle (step 605). The method also includes transmitting the notification information from a transmitter coupled to the first processor to a receiver coupled to a second processor of a remote device (step 610). The method also includes displaying, using a display screen coupled to the second processor, the notification information including whether the first vehicle is operating in the autonomous mode or the semi-autonomous mode and the description of the first vehicle (step 615).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for notifying a user outside of a vehicle as to whether the vehicle is operating in an autonomous mode or a semi-autonomous mode, the method comprising:
   activating, using a processor of the vehicle, an external indicator of the vehicle when the vehicle is operating in the autonomous mode or the semi-autonomous mode;
   determining, by the processor of the vehicle, notification information including whether the vehicle is operating in the autonomous mode or the semi-autonomous mode, an identification of at least one active or inactive feature of the autonomous mode or the semi-autonomous mode, whether the external indicator of the vehicle is activated, and a description of or details about the vehicle;
   transmitting the notification information from a transmitter coupled to the processor to a receiver of a remote device, the remote device being a cell phone, a smartphone or a tablet device; and
   displaying, using a display screen of the remote device, the notification information including whether the vehicle is operating in the autonomous mode or the semi-autonomous mode, the identification of the at least one active or inactive feature of the autonomous mode or the semi-autonomous mode, whether the external indicator of the vehicle is activated, and the description of or the details about the vehicle, the description of or the details about the vehicle including a make, a model, a year, a color, a type of vehicle, a license plate number or a photo of the vehicle, such that the user is able to identify and locate the vehicle based on the description of or the details about the vehicle.

2. The method of claim 1, wherein the notification information further includes a location of the vehicle.

3. The method of claim 1, wherein the external indicator is positioned on an external portion or surface of the vehicle.

4. The method of claim 1, wherein the external indicator is a LED light that when illuminated indicates the autonomous mode or the semi-autonomous mode.

5. The method of claim 1, further comprising a vehicle display screen coupled to the processor, the vehicle display screen allowing a user in the vehicle to manually or automatically set the autonomous mode or the semi-autonomous mode.

6. The method of claim 1, wherein the processor automatically activates the external indicator of the vehicle when the vehicle is operating in the autonomous mode or the semi-autonomous mode.

7. The method of claim 1, wherein the processor prevents a user in the vehicle from activating the external indicator of the vehicle when the vehicle is not operating in the autonomous mode or the semi-autonomous mode.

8. The method of claim 1, wherein the receiver of the remote device determines a direction of the notification information and provides the direction to the display screen of the remote device for display.

9. A method for notifying a second vehicle as to whether a first vehicle is operating in an autonomous mode or a semi-autonomous mode, the method comprising:
   receiving, at an electronic control unit of the first vehicle, notification information including whether the first vehicle is operating in the autonomous mode or the semi-autonomous mode, an identification of at least one inactive feature of the autonomous mode or the semi-autonomous mode, and a description of or details about the first vehicle;
   transmitting the notification information from a transmitter of the first vehicle to a receiver of the second vehicle; and
   displaying, using a display screen of a mobile computing device in the second vehicle, the notification information including whether the first vehicle is operating in the autonomous mode or the semi-autonomous mode, the identification of the at least one active or inactive feature of the autonomous mode or the semi-autonomous mode, and the description of or the details about the first vehicle, the description of or the details about the first vehicle including a make, a model, a year, a color, a type of vehicle, a license plate number or a photo of the first vehicle, such that a user in the second vehicle is able to identify and locate the first vehicle based on the description of or the details about the first vehicle.

10. The method of claim 9, further comprising activating, using the electronic control unit, an external indicator when the first vehicle is operating in the autonomous mode or the semi-autonomous mode.

11. The method of claim 10, wherein the external indicator is positioned on an external portion or surface of the first vehicle.

12. The method of claim 10, wherein the external indicator is a LED light that when illuminated indicates the autonomous mode or the semi-autonomous mode.

13. The method of claim 10, wherein the electronic control unit automatically activates the external indicator of the first vehicle when the first vehicle is operating in the autonomous mode or the semi-autonomous mode.

14. The method of claim 10, wherein the electronic control unit prevents a user in the first vehicle from activating the external indicator of the first vehicle when the first vehicle is not operating in the autonomous mode or the semi-autonomous mode.

15. The method of claim 10, wherein the notification information further includes whether the external indicator of the first vehicle is on or off.

16. The method of claim 9, further comprising a vehicle display screen coupled to the electronic control unit, the vehicle display screen allowing a user in the first vehicle to manually or automatically set the autonomous mode or the semi-autonomous mode.

17. The method of claim 9, wherein the receiver of the second vehicle determines a direction of the notification information or the first vehicle and provides the direction to the display screen of the mobile computing device in the second vehicle for display.

* * * * *